United States Patent
Kharas et al.

[11] Patent Number: 6,127,300
[45] Date of Patent: Oct. 3, 2000

[54] PROCESS FOR MAKING A CATALYST WITH NOBLE METAL ON MOLECULAR SIEVE CRYSTAL SURFACE

[75] Inventors: Karl C. C. Kharas; Heinz J. Robota, both of Tulsa, Okla.

[73] Assignee: ASEC Manufacturing General Partnership, Catoosa, Okla.

[21] Appl. No.: 09/012,095

[22] Filed: Jan. 22, 1998

Related U.S. Application Data

[63] Continuation-in-part of application No. 08/788,214, Jan. 27, 1997, Pat. No. 5,897,846.

[51] Int. Cl.$^7$ ..................................................... B01J 29/04
[52] U.S. Cl. ................................ 502/62; 502/64; 502/66; 502/67; 502/74
[58] Field of Search .................................. 502/66, 67, 68, 502/74, 439; 423/213.2, 213.5, 239.1, 239.2

[56] References Cited

U.S. PATENT DOCUMENTS

| | | | |
|---|---|---|---|
| Re. 31,919 | 6/1985 | Butter et al. ............................ | 502/66 |
| 3,275,571 | 9/1966 | Mattox .................................... | 252/451 |
| 3,346,510 | 10/1967 | Sinfelt et al. .......................... | 252/455 |
| 3,546,102 | 12/1970 | Bertolacini ............................. | 208/138 |
| 3,597,349 | 8/1971 | Bertolacini et al. .................... | 208/111 |
| 3,686,121 | 8/1972 | Kimberlin et al. ................. | 252/455 Z |
| 3,691,101 | 9/1972 | Mertzweiller et al. ............ | 252/455 Z |
| 3,775,342 | 11/1973 | Kronig et al. . | |
| 4,048,096 | 9/1977 | Bissot . | |
| 4,082,699 | 4/1978 | Petrow et al. . | |
| 4,448,891 | 5/1984 | Cohen ...................................... | 502/74 |
| 4,477,583 | 10/1984 | Rodewald ................................ | 502/71 |
| 4,556,646 | 12/1985 | Bezman . | |
| 4,608,356 | 8/1986 | Buss et al. . | |
| 4,683,214 | 7/1987 | Angevine et al. . | |
| 4,784,980 | 11/1988 | Bertolacini et al. ...................... | 502/25 |
| 4,803,186 | 2/1989 | Chen et al. .............................. | 502/66 |
| 4,882,307 | 11/1989 | Tsao . | |
| 4,904,633 | 2/1990 | Ohata et al. . | |
| 4,992,158 | 2/1991 | Schweizer . | |
| 5,017,541 | 5/1991 | Schmidt et al. . | |
| 5,029,061 | 7/1991 | Shek . | |
| 5,120,692 | 6/1992 | Beck ........................................ | 502/60 |
| 5,189,876 | 3/1993 | Shinya et al. . | |
| 5,201,802 | 4/1993 | Hirota et al. . | |
| 5,233,830 | 8/1993 | Takeshima et al. . | |
| 5,256,828 | 10/1993 | Cuscurida et al. ..................... | 568/620 |
| 5,290,534 | 3/1994 | Tsao . | |
| 5,292,696 | 3/1994 | Ito et al. ................................. | 502/66 |
| 5,292,991 | 3/1994 | Lachman et al. . | |
| 5,314,854 | 5/1994 | Galperin . | |
| 5,330,945 | 7/1994 | Beckmeyer et al. ..................... | 502/66 |
| 5,376,610 | 12/1994 | Takahata et al. . | |
| 5,495,059 | 2/1996 | Beck et al. .............................. | 585/470 |
| 5,783,515 | 7/1998 | Sakurai et al. ......................... | 502/207 |

*Primary Examiner*—Tom Dunn
*Assistant Examiner*—Cam N. Nguyen
*Attorney, Agent, or Firm*—Vincent A. Cichosz

[57] ABSTRACT

A catalytic converter for treating exhaust gas from an internal combustion engine containing a catalyst characterized by having platinum or a platinum alloy dispersed predominantly on the exterior surface of molecular sieve crystals. Also provided is a catalyst for such a converter and processes for manufacture of such catalyst. In addition, methods for treating exhaust gas from an internal combustion engine to reduce the amounts of hydrocarbon, carbon monoxide and nitrogen oxides emitted to the atmosphere are included.

21 Claims, 5 Drawing Sheets

PROCESS FOR MAKING A CATALYST WITH NOBLE METAL ON MOLECULAR SIEVE CRYSTAL SURFACE

This application is a continuation-in-part of application Ser. No. 08/788,214, filed Jan. 27, 1997, now U.S. Pat. No. 5,897,846.

FIELD OF THE INVENTION

This invention relates to a catalytic converter containing therein a catalyst having noble metal dispersed on the surface of molecular sieve crystals. This invention further relates to a catalyst suitable for such converter, a process for treating the exhaust gas from an internal combustion engine, and processes for making a catalyst having noble metal dispersed on the exterior surface of molecular sieve crystals.

BACKGROUND OF THE INVENTION

Catalytic converters containing various catalysts have been employed for years by automobile manufacturers to meet the ever-more-stringent regulations on emissions of hydrocarbon, carbon monoxide, and particularly, nitrogen oxides from internal combustion engines. Concurrently with the promulgation of these ever-tightening regulations on emissions, automotive engine manufacturers have worked to improve the fuel economy of such engines. This effort has led to the development of engines that operate with an excess of air beyond that which is required to consume stoichiometrically the fuel admitted to such engines ("lean-burn engines"). The advent of lean-burn engines has, in turn, exacerbated the problem of reducing emission of nitrogen oxides from internal combustion engines.

Various techniques have been developed to treat exhaust gas from internal combustion engines. One approach has been to provide multiple catalyst chambers in the exhaust system filled with different catalysts suited to particular tasks, such as that taught by Takeshima, et al. in U.S. Pat. No. 5,233,830.

Another approach is to provide a control system operating in conjunction with a catalytic converter, such as taught by Hirota, et al. in U.S. Pat. No. 5,201,802 and U.S. Pat. No. 5,189,876, and also by Takeshima in U.S. Pat. No. 5,029,061.

Clearly, there is a need for a simple system capable of treating exhaust gas from internal combustion engines, particularly the exhaust gas from lean-burn engines. The present invention is such a system, employing as it does a single catalytic converter having a single, unique catalyst contained therein which is capable of reducing the amount of hydrocarbon, carbon monoxide and, particularly, nitrogen oxides contained in exhaust gas prior to such gas's discharge to the atmosphere.

As stated above, the key element in such a system is the discovery of a catalyst which is effective in oxidizing hydrocarbon and carbon monoxide while being surprisingly effective at concurrently reducing nitrogen oxides in the environment presented by exhaust gas from internal combustion engines. Numerous inventions in this area have been taught by others skilled in the art, but none of these resembles more than superficially the catalyst of the present invention. For instance, U.S. Pat. No. 5,376,610 (Takahata, et al.) teaches, as part of a multi-catalyst system for exhaust gas purification, a catalyst consisting of alumina, and optionally zeolite, with Pt and/or Pd impregnated therein.

U.S. Pat. No. 5,292,991 (Lachman, et al.) teaches a catalyst consisting of a mixture of alumina and zeolite on a substrate with noble metal predominately dispersed on the alumina.

Patents have also been granted for catalysts intended for other uses, and some of these more closely resemble, at least superficially, the catalyst of the present invention. U.S. Pat. No. 5,314,854 (Galperin) teaches a catalyst designed primarily for the dehydrocyclization of paraffins to aromatics that consists of large pore molecular sieves mixed with binder and formed into pellets, spheres, or other such particles, said particles then having a surface-layer palladium component and uniformly dispersed platinum.

U.S. Pat. No. 4,992,158 (Schweizer) teaches a catalyst for reforming hydrocarbons having boiling points in the range of motor gasoline that is characterized as L-type zeolite not fully impregnated with Pt or Pd, using Pt- or Pd- acetylacetonate as the noble metal compound to treat the L-zeolite.

U.S. Pat. No. 5,017,541 (Schmidt, et al.) teaches a catalyst for the isomerization of alkanes consisting of particles of refractory inorganic oxide having a slightly higher concentration of a metal from the platinum group at the surface of such particles than at their center. The width of the surface-enriched band is 100–150 $\mu$m while the particles themselves have diameters of about 0.7–3.3 $\mu$m.

Still more patents have been granted for the preparation of noble metal/zeolite catalysts without regard to the use of same. U.S. Pat. No. 4,556,646 (Bezman) teaches a method for the preparation of a catalyst consisting of an inorganic oxide, a zeolite, and a noble metal in which ammonium nitrate is employed as an impregnating agent for Pd to produce a uniform distribution of the metal throughout the catalyst particles. Data are presented showing that, if ammonium nitrate is not used, Pd is concentrated in the outer shell of the catalyst particles. In this case, however, the Pd is deposited on the inorganic oxide as well as the zeolite, and the inventor suggests that deposition of Pd in the outer shell is a condition to be avoided.

U.S. Pat. No. 4,882,307 (Tsao) teaches the use of various salts, including sulfites, of cationic Pt complexes as an agent for the deposition of Pt into zeolite as a way of yielding highly dispersed Pt crystallites, after appropriate treatments.

U.S. Pat. No. 4,683,214 (Angevine, et al.) also teaches the use of sulfite salts of cationic noble metal complexes as a means of depositing noble metal on zeolite to yield, after appropriate treatment, very highly dispersed metal crystallites.

And, finally, U.S. Pat. No. 5,290,534 (Tsao) teaches that when a noble metal precursor is placed into a reactor during the production or synthesis of ZSM-18 substantially all of the noble metal remains on the outside of the synthesized ZSM-18. No indication is given that this is a desirable result, however, since the point of this invention is to provide a method of removing organic material blocking the pores of a zeolite.

SUMMARY OF THE INVENTION

It is a feature of the invention to provide superior catalytic converters for removing $NO_x$ from the exhaust of internal combustion engines that are operating with the air-to-fuel ratio in the lean range, that is, where the amount of oxygen supplied is greater than the stoichiometric amount needed to support combustion.

This invention provides for a catalytic converter suitable for treating exhaust gas from an internal combustion engine, and particularly for treating the gas from a lean-burn motor vehicle engine. The catalytic converter of the present invention comprises an exhaust gas processing vessel of suitable size and shape that is adapted to receive exhaust directly from the engine. Contained in this vessel is an effective amount of a catalyst coating uniformly dispersed on a suitable substrate. The substrate, in turn, is adapted to fit within the vessel in such a way as to assure that the exhaust gas adequately and effectively contacts the catalyst coating on the substrate.

The catalyst coating for use in this invention is characterized as containing molecular sieve crystals on the surface of which has been uniformly dispersed a catalytically effective amount of a noble metal, preferably platinum or a platinum alloy. The molecular sieve crystals on which the noble metal has been dispersed have diameters within a range of about 0.5 to about 50 μm. The noble metal is dispersed on the surface of the molecular sieve crystals in such a manner as to locate at least 90% of the noble metal within 50 nm (500 Å) of the exterior surface of the crystals.

This invention also provides a catalyst for such a catalytic converter and processes for making such catalyst. In one process for making the catalyst according to this invention such that the noble metal is dispersed predominately on the exterior surface of the molecular sieve crystals, the first step is to prepare an aqueous suspension of the molecular sieve crystals and a noble metal reagent that will chemisorb onto the exterior 50 nm (500 Å) of the said crystals.

Depending on the noble metal reagent used, bonding of the reagent to the sieve will be either covalent or ionic. If the reagent chosen forms a covalent bond, it is important that the molecular sieve crystals used in this process be modified to have a very thin film of aluminum oxide on their exterior surfaces. The choice of method for forming this thin alumina film depends on the Si/Al ratio of the zeolitic precursor. Sufficient acid or base may be added to the suspension to adjust the pH to between about 7–8. Any pH adjustment should be done using a material that will decompose to yield gaseous products when its temperature is raised above about 150° C. If the reagent chosen forms an ionic bond to the sieve, no modification to the zeolite to form a thin alumina film is necessary, but the pH of the aqueous suspension of molecular sieve crystals and noble metal reagent should be above 10 and the chosen reagent must be a cationic noble-metal complex whose kinetic radius of its smallest conformation is larger than the largest crystallographically-defined pore of the zeolite chosen. Appropriate noble metal reagents of the type that form a covalent bond that, when suspended in water, will chemisorb onto the exterior 50 nm (500 Å) of said crystals include Pt sulfite and $[N(C_2H_5)_4]_2[Pt(OH)_6]$. Appropriate noble metal reagents of the type that form an ionic bond that, when suspended in water, will chemisorb onto the exterior 50 nm (500 Å) of said crystals, include $[Pt(NH_2CH_2CH_2NH_2)_2][OH]_2$ and $[Pt(NH_2CH_2CH_2NH_2)_2][CO_3]$. After adequate stirring the suspension is coated onto a suitable substrate, dried and calcined at a temperature sufficient to decompose the base reagent material.

Alternatively, a catalyst containing molecular sieve crystals of at least one type having noble metal dispersed predominantly on the exterior surface of the crystals can be made by a process in which the first step is to prepare an aqueous suspension of the crystals with a hydrophilic polymer having a density between about 0.8 and about 1.0 gm/cm³, the amount of polymer used being sufficient to fill the pores of the molecular sieve crystals used. Thereafter a suitable noble metal reagent (which need not be chemisorbing) is added to the suspension, the pH adjusted to between about 7 and 8, and the suspension then coated on a suitable substrate, dried and calcined. In the process of heating, the material used to adjust the pH and the hydrophilic polymer are completely burned off and vaporized, thereby leaving the noble metal dispersed uniformly on the first 50 nm (500 Å) of the molecular sieve crystals.

A third method for making a catalyst containing molecular sieve crystals of at least one type having noble metal dispersed predominantly on the exterior surface of the crystals employs the use of colloidal particles of platinum or a platinum alloy of a size substantially greater, by at least a factor of two, than the largest crystallographically defined pore diameter of the molecular sieve crystals onto which the noble metal is to be deposited.

Finally, this invention provides processes for treating exhaust gas from an internal combustion engine using the catalytic converter and catalyst of the present invention.

DETAILED DESCRIPTION OF THE INVENTION

The catalytic converter of the present invention comprises a vessel and a catalyst contained in the vessel.

Vessel

The exhaust gas processing vessel may be any suitable shape and configuration, with cylindrical or "flattened" cylindrical (i.e., an extended oval) being the preferred shapes, that provides a substantially uniform distribution of exhaust gas throughout and an efficient flow over the catalyst to be contained therein. The vessel should have sufficient void volume to contain a catalyst sized so that the gas hourly space velocity ("GHSV") over the catalyst is no greater than about 150,000 hr$^{-1}$ when the engine producing the exhaust gas to be treated is operating at its maximum sustainable load. The vessel should be fitted at its inlet end with a tubular conduit adapted to receive exhaust from the engine exhaust manifold, and at its outlet end with a tubular conduit adapted to transmit treated exhaust to a muffler or directly to the atmosphere. Materials of construction of the vessel and inlet and outlet conduits are well known to those skilled in the art and may be of any metal or composite able to withstand temperatures of up to about 1200° C. with minimal corrosion from the compounds normally contained in internal combustion engine exhaust gas.

Catalyst

The catalyst is comprised of a substrate on which has been suitably applied an effective amount of a catalytically active coating containing at least one type of molecular sieve crystals, with platinum or a platinum alloy uniformly dispersed on the exterior surface of such crystals. The coating may also contain a binder and one or more types of molecular sieve crystals.

Substrate

The substrate may be any of the shapes employed by those skilled in the art such as extrudates, spheres, beads, tablets, and the like, but monoliths, either metallic or ceramic, are preferred. The substrate should be inert in the sense that it does not react with the coating or with the exhaust gas to which it is exposed during engine operation.

If a monolith is employed as the substrate, it should be sized and shaped so that it fits within the vessel and leaves no gaps between the vessel interior wall and the outside surface of the monolith which might result in blow-by of the exhaust gas past the monolith (i.e., bypassing of the catalyst). Ceramic monoliths, if employed, should be provided with a mat-mount between the exterior surface of the monolith and the vessel wall, as is customary in the industry, to cushion vibration during engine operation and also to prevent blow-by of the engine exhaust gas past the catalyst. Metallic monoliths should be attached to the vessel wall, as is customary. There should be provided sufficient monolith to result in a GHSV as defined above in the discussion on Vessel.

Coating

The coating is comprised of suitable molecular sieve crystals, onto the exterior surface of which crystals a catalytically effective amount of platinum or a platinum alloy has been dispersed in a manner such that at least 90% of the platinum or platinum alloy is deposited within the exterior 500 Å of the surface of such crystals. An inorganic oxide binder may be included in the coating, but it is an important aspect of this invention that little of the platinum or platinum alloy be deposited on such inorganic oxide binder. If a binder is employed it is important that the binder and molecular sieve crystals be thoroughly mixed so that the crystals are uniformly dispersed throughout the coating.

The coating should be uniformly applied to the substrate. The coating's thickness should be no more than about 200 microns and no less than about 1 micron, with a coating thickness averaging between about 20 microns and 40 microns being preferred. Any method known to those skilled in the art including, without limitation, immersion of the substrate in an aqueous suspension of the desired coating or spraying of the suspension onto the substrate, may be employed to achieve the desired coating thickness and uniformity of application. The preferred method of application onto monoliths is "piston coating", which involves placing the monolith above a reservoir containing an amount of the coating, compressing the coating up into the monolith with a piston, withdrawing the piston to permit the coating to drain back into the reservoir, and then immediately clearing the channels of the monolith with a slotted knife that emits compressed air. This method is particularly useful when applying coatings containing large mass fractions of molecular sieves since the sieve density is quite low.

Following application of the coating to the substrate, the coated substrate is dried and then calcined at a temperature of between about 400 and about 550° C. for 2 to 4 hours.

Molecular sieve

Only a single type of molecular sieve crystal is necessary as the catalyst support in the present invention. Any type of molecular sieve having an average pore size between about 0.4 nm (4 Å) and about 1 nm (10 Å) may be used, with the preferred type being USY having a pore size being between 0.7 nm (7 Å) and 0.8 nm (8 Å). The size of the crystals, regardless of the type chosen, should be between 0.5 and 50 microns, however, and a crystal size between about 1 and about 2 microns is preferred. If noble metal is to be deposited by covalent chemisorption, the silica/alumina ratio should be between about 10 and about 100,000, preferably between about 10 and about 100. If noble metal is to be deposited by ionic chemisorption, the silica/alumina ratio should be between about 20 and about 100,000, preferably between about 20 and about 100.

If the method to be used for noble metal deposition is covalent chemisorption, the molecular sieve should be modified to establish a thin alumina film on its exterior surfaces, either by steaming to mildly de-aluminate sieve crystals having a low Si/Al ratio or by treatment with an aqueous solution of very small pseudo-boehmite crystallites for sieves with a high Si/Al ratio. Optionally, the sieve crystals may be treated to expose acid sites on the crystal surface.

Some applications, however, such as those in which it is desirable to adsorb hydrocarbon during cold start of an engine, might benefit from incorporation into the coating a second, or even a third, type of sieve having characteristics desirable to that application. For instance, in a catalytic converter is intended for treatment of diesel exhaust, it might be desirable to employ two types of sieve, one with an average pore size less than 6 Å on which platinum or a platinum alloy has been dispersed and another (with an average pore size greater than 0.6 µm) which is capable of adsorbing the large hydrocarbon molecules present in the exhaust gas from such diesel engines. This larger-pore sieve would not necessarily require platinum or a platinum alloy dispersed thereon since conversion of hydrocarbon, carbon monoxide, and nitrogen oxides would be catalyzed primarily by the smaller-pore sieve.

Binder

As is the case with many catalysts, it is sometimes desirable to incorporate with the zeolite another material resistant to the temperatures and other conditions encountered in the environment to which the catalyst is to be exposed. Often, these materials are inactive, thereby serving as diluents so that the desired conversion can be obtained economically without employing other means for controlling the rate of reaction. At other times, a binder may serve to improve the adhesion of the zeolite-containing coating to the substrate. Binders useful for compositing with the zeolites of this invention include inorganic oxides such as alumina, silica, alumina-silicates, titania, magnesia, zirconia, beryllia, and mixtures thereof, with alumina, titania, and zirconia being preferred, and with milled alumina being particularly preferred.

The relative proportions of finely divided zeolite crystals and inorganic oxide binder may vary widely with the zeolite content ranging from about 1 to about 90 weight percent, and more usually in the range of about 10 to about 50 weight percent of the composite.

Noble Metal

Platinum used alone is the preferred noble metal for use in this invention. In addition, however, platinum alloyed with rhodium, iridium, palladium, silver, or gold may be employed as the noble metal.

Preparation of Catalyst

The key element of the present invention is that the platinum or the platinum alloy be dispersed predominantly on the exterior surface of the zeolite crystals chosen for the particular application, and preferably so that a very high proportion, above 90%, of the platinum or the platinum alloy is sited within 50 nm (500 Å) of the exterior crystal surfaces. It has been discovered that there are a number of methods of dispersing platinum or a platinum alloy on zeolite in a suitable manner. These methods involve contacting a suspension of a platinum or a platinum alloy salt with the zeolite crystals on which the platinum or a platinum alloy is to be dispersed in the absence of any other type of zeolite crystals or any inorganic oxide binder which is or are to be included in the catalyst.

One such method employs, as the depositing agent for platinum or a platinum alloy, compounds that will chemisorb predominantly on and near the exterior surface of the zeolite crystals by forming either a covalent or an ionic bond between the noble metal and the zeolite. This method is particularly preferred. Compounds that form a covalent bond include Pt sulfite, $[N(C_2H_5)_4]_2[Pt(OH)_6]$, and Pt ethanolamine, with Pt sulfite being preferred; compounds that form an ionic bond include $[Pt(NH_2CH_2CH_2NH_2)_2][OH]_2$ and $[Pt(NH_2CH_2CH_2NH_2)_2][CO_3]$. The Pt sulfite employed in this invention should be a non-cationic square-planner Pt complex in which each Pt has two Pt-S bonds and whose charge is believed to be between −4 and zero, depending on pH.

Another method involves pretreatment of the zeolite crystals on which platinum or a platinum alloy is to be dispersed with a sufficient amount of hydrophilic polymer prior to exposure of the crystals to a platinum or a platinum alloy salt suspended in water. The hydrophilic polymer should be applied so as to fill up or block a sufficient number of the zeolite pores to intrusion of platinum species or a platinum alloy colloid into the crystal interior. The hydrophilic polymer will be subsequently removed completely from the catalyst during calcining of the finished catalyst. Some hydrophilic polymers suitable for this purpose include polyethylene glycol, polyvinyl glycol and polyvinyl pyrollidone, with polyethylene glycol being particularly preferred.

A third method employs, as the depositing agent for platinum or a platinum alloy, metallic colloidal particles of platinum or a platinum alloy of a size substantially greater, by at least a factor of two, than the largest crystallographically defined pore diameter of the molecular sieve crystals onto which the noble metal is to be deposited.

A fourth method, involving placing a noble metal precursor into the reactor during the production or synthesis of a zeolite, is taught in U.S. Pat. No. 5,290,534 (Tsao).

Preparation Using Pt Reagents that Chemisorb onto Zeolite Crystal Exterior Surface In this preferred method of preparation, an amount of platinum or a platinum alloy reagent capable of being chemisorbed onto the exterior of molecular sieve crystals is mixed with an aqueous suspension of the type and size of molecular sieve crystals to be employed in the catalyst.

If the reagent chosen forms a covalent bond with the zeolite, it is important that the molecular sieve crystals used in this process be modified to have a very thin film of aluminum oxide on their exterior surfaces. The choice of method for forming this thin alumina film depends on the Si/Al ratio of the zeolitic precursor. For molecular sieves that have Si/Al ratios less than about 12 such as Zeolite Y, the requisite alumina film can be established by de-aluminating the zeolitic precursor to some degree by exposure to steam. For molecular sieves with Si/Al ratios greater than about 12 such as MFI-38 that do not have sufficient constituent aluminum to permit formation by de-alumination of a useful alumina film while retaining high acid site concentration, the requisite alumina film can be established by treating the zeolitic precursor with an aqueous solution of very small crystallite boehmite. The boehmite crystallites used to promote formation of this thin alumina film should be less than about 4 nm in size, with crystallites of between 2.5 nm and 3.5 nm being preferred. The solution employed should be such that significant aggregation of the crystals has not occurred. Sols that are essentially colorless and transparent but nevertheless contain alumina equivalent to over 5 wt. % alumina have not had significant agglomeration of the boehmite crystallites. The use of this procedure results in the exterior surfaces of the zeolite being derivatized, with a thin (approx. 3 to 5 nm) alumina film deposited thereon.

If the reagent chosen forms an ionic bond with the zeolite, it is important that the zeolite chosen have a Si/Al ratio above about 20 and that the pH of the aqueous suspension of zeolite be above 10, prior to the addition of the noble metal compound, to deprotonate the siliceous exterior surface of the zeolite.

The amount of noble metal reagent added should be determined by the noble metal loading desired in the catalyst to be prepared. The range of noble metal loadings should be between 0.05% and 10% of sieve weight, with the preferred range being between about 1 and about 3 weight % of sieve weight.

If the reagent chosen forms a covalent bond with the zeolite, sufficient base is then added to the suspension to adjust its pH to between about 7 and 8. The base employed should be one that will decompose to yield gaseous products when its temperature is raised above about 150° C., and the preferred base is tetramethylammonium hydroxide. If the reagent chosen forms an ionic bond with the zeolite, no further pH adjustment is required because the aqueous suspension of zeolite should already be at a pH above 10. The suspension is then stirred long enough to allow the noble metal reagent to be chemisorbed onto the molecular sieve crystals, a period of at least one hour.

If another type of molecular sieve crystals is to be included in the catalyst being prepared, an aqueous suspension of this second type of molecular sieve is then added to the suspension already prepared. Along with this second type of molecular sieve, or instead of it if only one type of molecular sieve is to be included in the catalyst, an aqueous suspension of a suitable binder, preferably one such as alumina, titania, or zirconia, may optionally be added to the mixture already prepared. The entire mixture is then stirred for a period of time sufficient to thoroughly mix the compounds that have been included in the suspension.

The suspension as prepared is then applied to a substrate, preferably a monolith, by any of the methods known to those skilled in the art, and preferably by piston coating, to achieve the desired thickness of coating disposed on the substrate. It is then dried and calcined by any of a number of methods known to those skilled in the art.

Preparation Using Hydrophilic Polymer

In this method of catalyst preparation, a hydrophilic polymer is employed to fill the pores of the molecular sieve crystals prior to application of platinum or a platinum alloy to the crystals, thereby preventing the platinum or a platinum alloy from being deposited other than on the surface of the crystals.

Suitable hydrophilic polymers will be any such polymer having a density of between about 0.8 and 1.0 gm./cm.$^3$ and that completely volatilizes at calcining temperatures. Preferred polymers for this application include, without limitation, polyethylene glycol, polyvinyl glycol and polyvinyl pyrollidone. Polyethylene glycol is particularly preferred.

In this method of catalyst preparation then, an amount of hydrophilic polymer sufficient to fill the pores of the molecular sieve crystals, without overfilling thereby leaving polymer on the surface of the crystals, is added to an aqueous suspension of the molecular sieve to be used, and the suspension is stirred for a period of at least 30 minutes to promote adsorption of the polymer in the pores of the crystals. A suitable method for determining the amount of polymer to apply is:

1) the pore volume per unit mass of the molecular sieve to be employed is measured;
2) a concentrated solution of a hydrophilic polymer is prepared and the density of the solution is determined;
3) the quantity of the hydrophilic polymer solution to be added to the molecular sieve is set so that the product of the mass of the sieve to be treated times the sieve's pore volume per unit mass of sieve times the density of the hydrophilic polymer solution divided by the mass of polymer solution is between 1 and 0.25.

Following adsorption of the polymer into the crystal pores, a quantity of de-ionized water may be added to the solution to yield an appropriate coating precursor.

Any platinum or a platinum alloy reagent known to those skilled in the art is then added to the suspension in an amount determined to provide the desired platinum or platinum alloy loading on the final catalyst, in a similar manner to the method described above. The remainder of this procedure is the same as for the procedure above using those platinum or platinum-alloy reagents that chemisorb preferentially on the surface of the molecular sieve crystals.

Preparation Using Colloidal Particles of Noble Metal

This method of preparation is superficially similar to the method described above using Pt reagents that chemisorb onto the exterior surface of molecular sieve crystals, although the nature of the chemical interactions resulting in deposition of the colloidal metal onto the zeolite is believed to be different.

An aqueous suspension of colloidal particles of platinum or a platinum alloy is added to an aqueous suspension of molecular sieve crystals. It is necessary that the size of the colloidal particles be at least twice the largest crystallographically-defined pore diameter of the molecular sieve crystals so that the colloidal particles cannot enter the crystal pores, and are therefore adsorbed on the surface of the crystals. The pH may optionally be adjusted to promote chemisorption of the colloidal metal onto the molecular sieve. The remainder of this procedure is the same as for the procedure above using those platinum or platinum-alloy reagents that chemisorb preferentially on the surface of the molecular sieve crystals.

EXAMPLE 1

This example describes the preparation of a catalyst of the present invention in which Pt is covalently chemisorbed on the sieve exterior surface.

An aqueous suspension of ultra-stable Y molecular sieve that had been partially de-aluminated by exposure to steam was prepared and sufficient Pt sulfite was added to yield molecular sieve crystals having about 2 wt. % Pt on sieve. Sufficient tetramethylammonium hydroxide was added to raise the pH to about 7 and the suspension was then stirred for several hours to permit chemisorption reactions between the Pt sulfite and the molecular sieve crystals to occur. Then a milled suspension of Condea SCFA-90, consisting predominately of θ-alumina, was added without the normal addition of acid that partially peptizes the alumina. The mixture was then stirred for several hours, dried and calcined.

Figure 1:
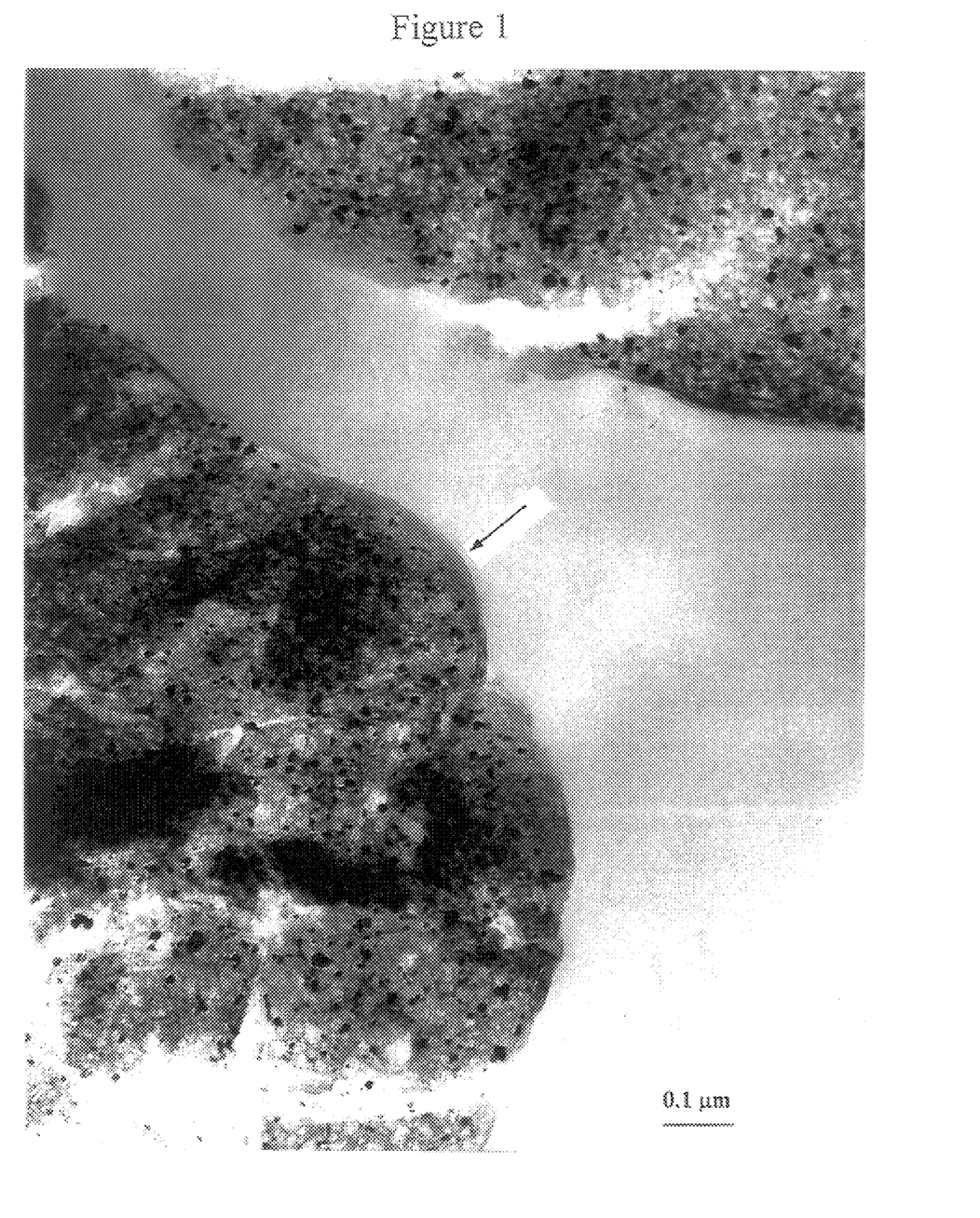
FIG. 1 is a micrograph of the powder used to coat the monolith in one embodiment of the present invention.

A sample of this material was analyzed by cutting thin sections of particles contained in the sample. FIG. 1 is a micrograph of these particles. It is clear from this figure that Pt is not found throughout the bulk of the molecular sieve crystals; rather, Pt does occur at the exterior surface of the molecular sieve crystals, appearing as dark particles.

EXAMPLE 2

(Comparative)

This example describes the preparation of a catalyst that has been suggested in the prior art for use in treating exhaust gas from an internal combustion engine.

Figure 2:
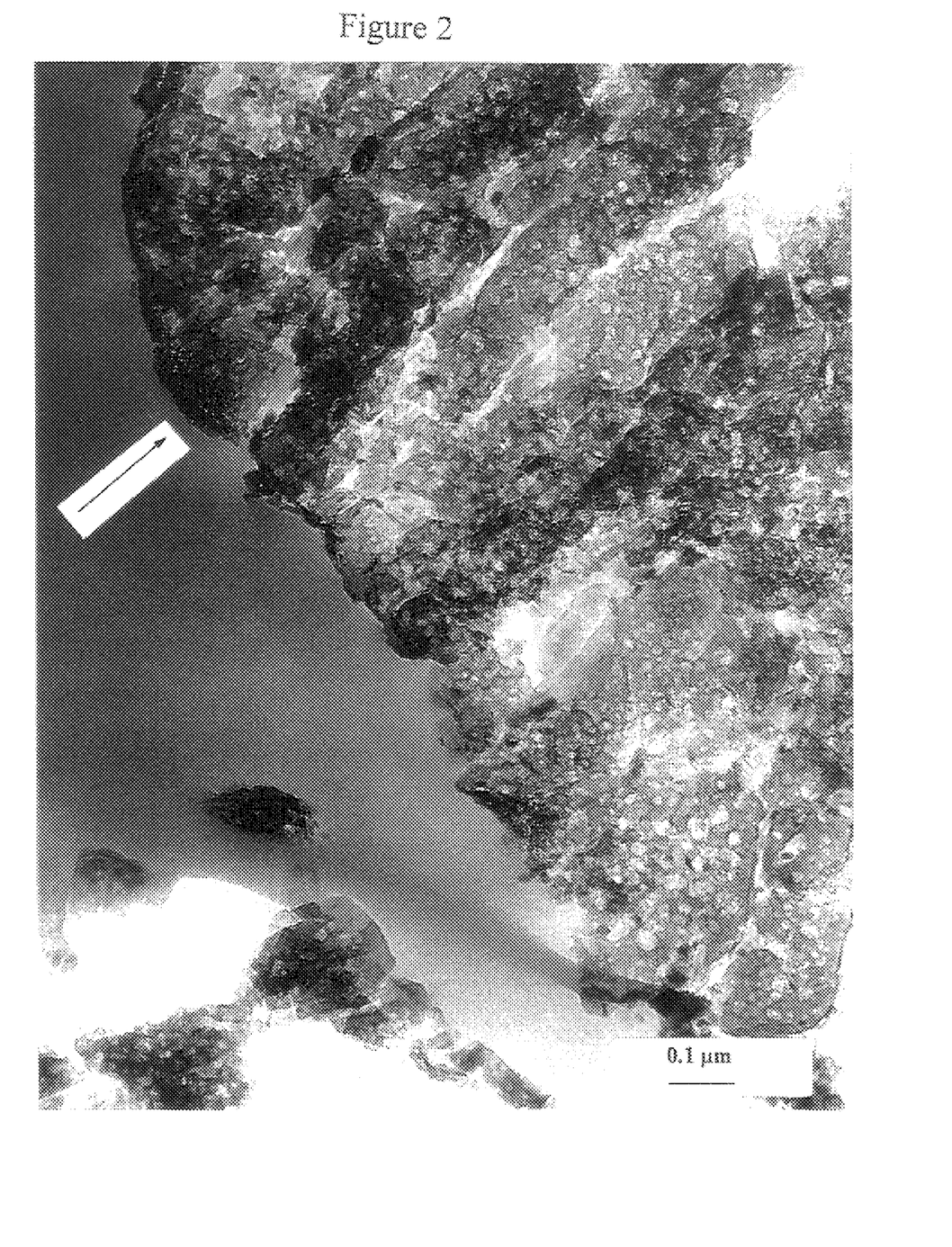
FIG. 2 is a micrograph of a thin section of the inside, together with portions of their exterior edges, of two molecular sieve crystals taken from the coating of a catalyst prepared by one of the methods presented herein but using a platinum reagent that does not chemisorb onto the exterior surface of molecular sieve crystals. This catalyst is typical of platinum-containing molecular sieve catalysts that have been suggested in the prior art for use in treating exhaust gas from an internal combustion engine.

A catalyst sample was prepared using the same method as employed in Example 1, except that [Pt(NH$_3$)$_4$][OH]$_2$ was used as the platinum reagent instead of Pt sulfite. Again, a sample of this material was analyzed by cutting thin sections of particles contained in the sample. FIG. 2 is a micrograph of these particles. In this figure is shown dark particles through the bulk of the sieve crystals. An arrow points to a film on the surface of the crystal. It should be noted that no platinum is present on this film; rather, the platinum is present in regions away from the edges. The possibility that those platinum particles are at the exterior surface can be dismissed since, in the regions where platinum is seen, the exterior surface has been cut away.

EXAMPLE 3

(Comparative)

This example compares the performance (as measured by NO$_x$ conversion) of the catalyst prepared by the process described in Example 1 against that of the system prepared in Example 2.

Catalytic converters were manufactured using the suspensions prepared in Examples 1 and 2 applied to equivalent size and type monoliths followed by drying and calcining. One converter at a time was connected to the exhaust pipe of a Peugeot IDI, turbocharged U60 engine. Catalyst inlet temperature was varied at constant speed (1540 rpm) by variation of the load placed on the engine, i.e., as load increased, inlet temperature increased. Diesel fuel was injected into the exhaust gas between the engine outlet and the converter inlet to adjust the hydrocarbon/NO$_x$ ratio to 10 at each load set point. NO$_x$ concentrations were determined using a chemiluminescent NO$_x$ analyzer.

Figure 3:
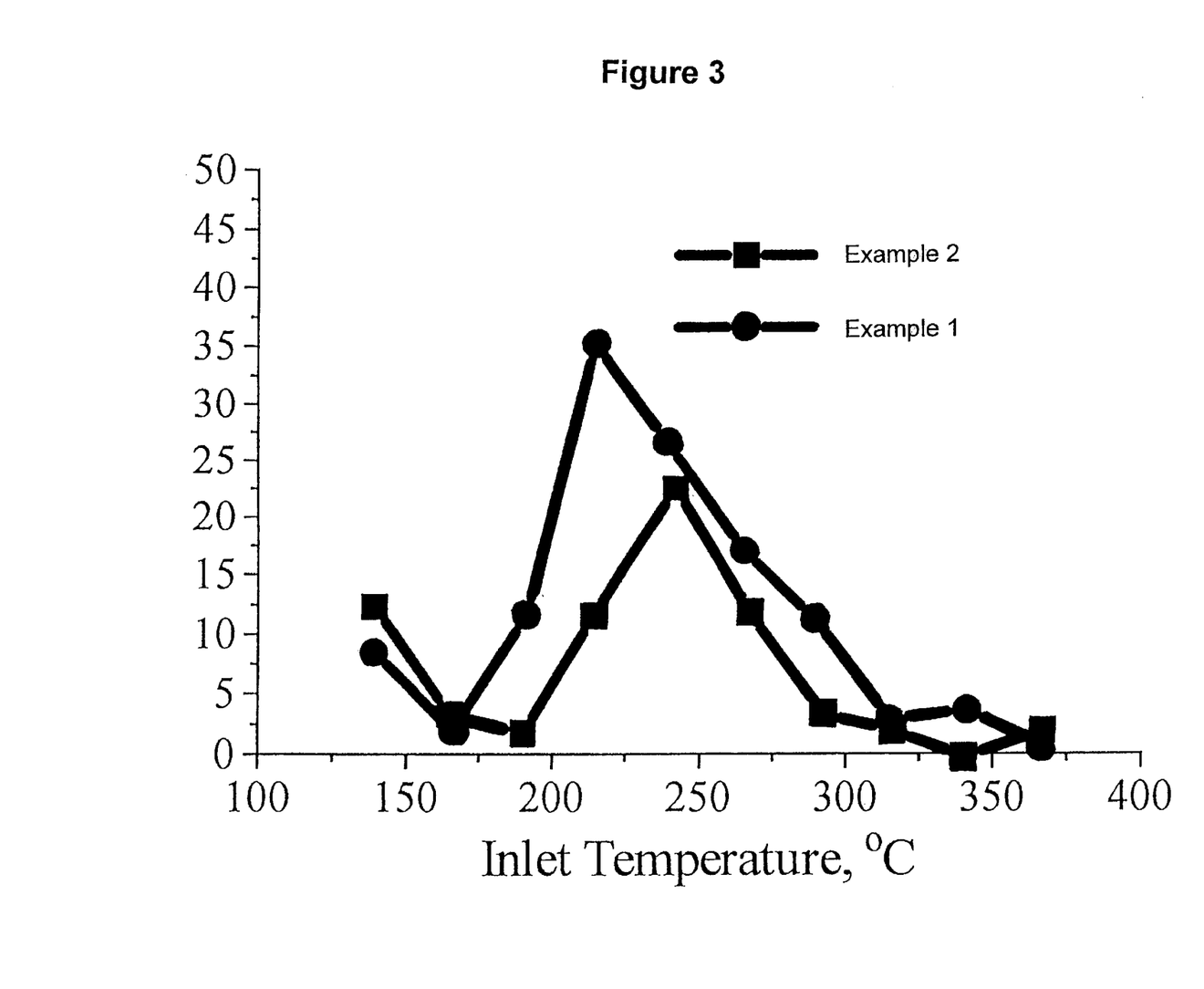
FIG. 3 presents data comparing the performance (shown as $NO_x$ conversion) of the present invention against that of a typical catalytic converter using a typical catalyst when used to treat exhaust gas from the same lean-burn diesel engine.

The results of this test are shown in FIG. 3. NO$_x$ conversion versus converter inlet temperature is plotted for each of the converters, with the performance of the converter using the catalyst prepared as in Example 1 shown as solid circles, ●, and that of the converter using the system prepared as in Example 2 as solid squares, ■. It is clear that the converter of the present invention demonstrates far superior $NO_x$ conversion compared to the converter using a typical catalyst formulation. $NO_x$ conversion begins at a lower temperature, reaches a higher maximum, and continues at a higher level over the entire temperature range of interest.

EXAMPLE 4

This example describes preparation of catalysts of the present invention in which Pt is covalently chemisorbed on the sieve exterior surface. It illustrates a variant of the method described in Example 1 that is useful where the zeolite employed has a high Si/Al ratio.

Three suspensions, each containing 20 grams of a molecular sieve with the MFI structure and a Si/Al ratio of 19 in 100 grams of de-ionized water, were prepared. Two grams of Condea Tondersol 10/2, a very fine, 10 wt. % dispersion of pseudo-boehmite in water, was added to the first suspension, 10.5 grams to the second and 22.2 grams to the third. Catalytic coating precursors containing 1%, 5% and 10% added $Al_2O_3$, respectively, were produced. After stirring for 5 minutes, each mixture was quantitatively transferred to a steam evaporator and the water evaporated away over a period of three hours. The resulting solids were then separately calcined at 500° C. for 4 hours. Then, 10 gram samples of each of these solids were suspended in 50 grams of de-ionized water. To each suspension about 2 grams of a 9.94% Pt sulfite aqueous solution was added, making three suspensions differing only in alumina content. After stirring for one hour, each was filtered and the resultant solid calcined at 500° C. for 4 hours.

A fourth sample of catalyst was prepared according to the procedure described above, but without the addition of Condea Tondersol 10/2.

The chemical compositions of the resulting catalysts are shown in Table 1

TABLE 1

| Designation: | MFI | MFI-1% $Al_2O_3$ | MFI-5% $Al_2O_3$ | MFI-10% $Al_2O_3$ |
|---|---|---|---|---|
| Added $Al_2O_3$: | None | 1% | 5% | 10% |
| Al, %: | 2.458 | 2.982 | 4.352 | 7.493 |
| Si, %: | 42.233 | 42.646 | 41.931 | 38.737 |
| Pt, %: | 0.142 | 0.193 | 0.557 | 1.360 |

It should be noted that the platinum content of the samples increases in rough proportion to the added alumina. Since the alumina is size-excluded from the zeolite and therefore resides on exterior surfaces of the MFI crystals, the Pt is supported on alumina that is supported on the zeolite, in rough analogy to the Pt-Y material prepared in Example 1.

EXAMPLE 5

The effectiveness for $NO_x$ reduction of the four catalysts prepared in Example 4 is compared in this example.

In turn, a 1 gram sample of each of the materials was loaded into a quartz reactor which was placed in a furnace and subjected to the following program. A gas consisting of 1000 ppm $NO_x$, 300 ppm CO, 8% $H_2O$, 8% $CO_2$, 500 ppm octane, 20 ppm $SO_2$, 12% $O_2$, and the balance $N_2$ was passed over the sample at a flow rate of 5 liters per minute. The inlet temperature to the reactor was increased from about 50° C. to 550° C. at a rate of 7° C. per minute, then held constant for one hour, and finally cooled rapidly until the reactor temperature returned to 50° C. The heating, holding and cooling regimen was then repeated.

Figure 4:
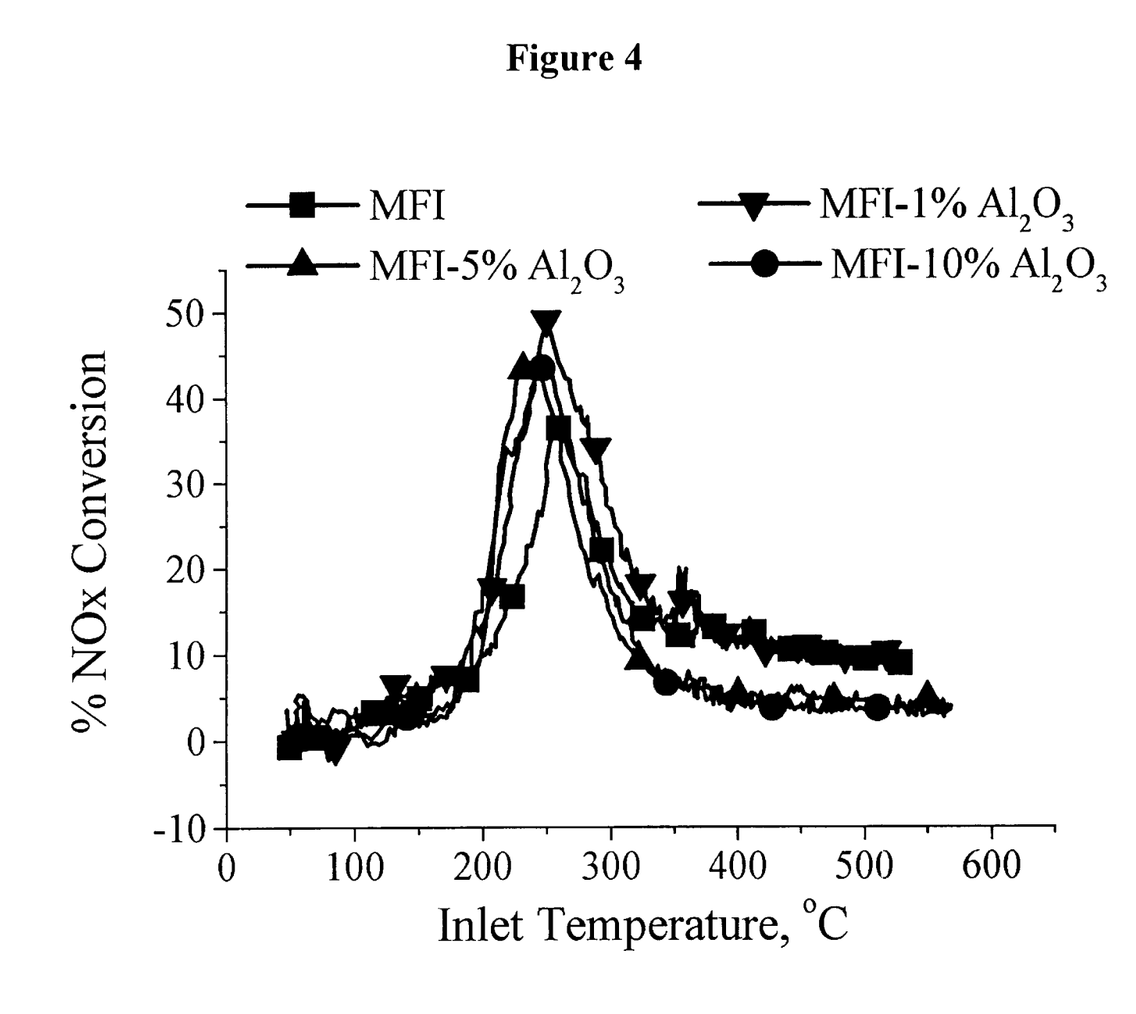
FIG. 4 presents data comparing the performance (shown as $NO_x$ conversion) of three catalysts of the present invention against that of a similar catalyst prepared without using the process taught by the present invention.

FIG. 4 shows $NO_x$ conversion as a function of catalyst inlet temperature during the first temperature ramp for each of the samples. The data obtained during the second ramp were essentially identical. The catalyst designated MFI, having no added alumina, shows modest performance. Maximum $NO_x$ conversion is about 36%. $NO_x$ conversion for the catalyst designated MFI-1%$Al_2O_3$ increases to 50%, and the range of temperature over which significant conversion occurs, the "conversion window", is considerably broader than for the MFI catalyst. The modest increase in Pt content (0.19% vs. 0.15%) is quite effective at improving $NO_x$ conversion. This is as expected for platinum situated on the exterior surfaces of the molecular sieve. The additional alumina, and consequent increases in Pt chemisorption, associated with the other two samples produces modest incremental improvement.

EXAMPLE 6

This and the following example describe preparation of catalysts of the present invention using colloidal Pt particles to deposit Pt on the sieve exterior surface.

20 grams of $NH_4$-Beta zeolite were suspended in 200 grams of de-ionized water. To this suspension, 22.3 grams of a stable aqueous Pt colloid solution prepared by PGP Industries, Inc. that contains 1.83 wt. % of Pt colloid particles roughly 2 $\mu$m. in size were added. The suspension was then stirred for 2 hours and filtered. The filter cake was dried at 100° C. for about 60 hours. Analysis of a sample of the filter cake showed that the Pt content of fine powder was 1.29%. Transmission Electron Microscopic (TEM) examination of thin sections of the catalyst revealed homogeneously distributed, apparently non-faceted Pt particles about 2 nm in size. Since the largest micro-pore opening in Beta is about 0.7 nm, it can be concluded that the Pt is on the exterior surface of the Beta. Relatively high concentration of Pt occurs apparently due to the disordered, mesoporous texture of Beta that results in a relatively high exterior surface area.

EXAMPLE 7

A sample of catalyst was prepared using the same procedure as Example 6 except that the zeolite used was H-MFI. TEM examination revealed the same structure as the catalyst in Example 6, but the resulting catalyst had a Pt content of only 0.06%. The lower Pt content is due to the nature of the MFI crystals which are about 1 micron in size with very little surface area available for metal deposition. Since very little surface area is available for physical adsorption, and apparently there is not a strong driving force for chemisorption with this procedure, only a small amount of Pt is deposited. Since the largest micro-pore opening in MFI is about 0.55 nm, it can be concluded that the Pt is on the exterior surface of the MFI.

EXAMPLE 8

This example describes preparation of catalysts of the present invention using bulky Pt complexes to deposit Pt on the sieve exterior surface by ionic chemisorption.

A solution of bis(ethylenediamine)Pt(II) hydroxide containing 5.92 wt. % Pt was supplied by PGP. Three solutions were prepared, each containing 6.895 grams of the PGP solution diluted with 185 grams of de-ionized water. To each of the solutions 20 grams of a molecular sieve with the MFI structure and a Si/Al ratio of 19 were added. The pH of the resulting solutions was about 6. Tetraethylammonium hydroxide was added to the solutions to raise the pH of one sample to 8.5, another to 9.0 and the third to 11.0. The solutions were stirred overnight, then filtered and calcined in air for 4 hours at 400° C.

Samples of fine powder from each catalyst were embedded in epoxy, thin-sectioned and examined by TEM, which revealed Pt particles from 10 to 50 nm. The particles decreased in size with increasing pH of the synthesizing solution, which is consistent with generation of the largest number of adsorption sites on the siliceous surface of MFI at highest pH. As in Example 7, due to the large size of the Pt complex relative to the zeolite pore size, it can be concluded that the Pt is on the exterior surface of the MFI.

EXAMPLE 9

(Comparative)

An aqueous suspension of Condea SCFA-90 alumina was mixed with Pt sulfite for a period of time sufficient to result in chemisorption of the platinum. The suspension was then mixed with ultra-stable Y molecular sieve that had been partially dealuminated by exposure to steam. However, since the Pt had already chemisorbed onto the alumina, essentially no Pt was deposited onto the zeolite. The mixture was wash-coated onto a monolithic substrate and then manufactured into a catalytic converter. This procedure is the preferred procedure taught by Lachman '991. The volumetric concentrations of Pt, alumina, and molecular sieve were about the same as in the catalyst of Example 1.

The performance of this catalytic converter was then compared to that of the converter of Example 3 made from the suspension of Example 1. One converter at a time was connected to the exhaust pipe of a Peugeot IDI, turbocharged U60 engine. Catalyst inlet temperature was varied at constant speed (1540 rpm) by variation of the load placed on the engine, i.e., as load increased, inlet temperature increased. Diesel fuel was injected into the exhaust gas between the engine outlet and the converter inlet to adjust the hydrocarbon/$NO_x$ ratio to 10 at each load set point. $NO_x$ concentrations were determined using a chemiluminescent $NO_x$ analyzer.

Figure 5:
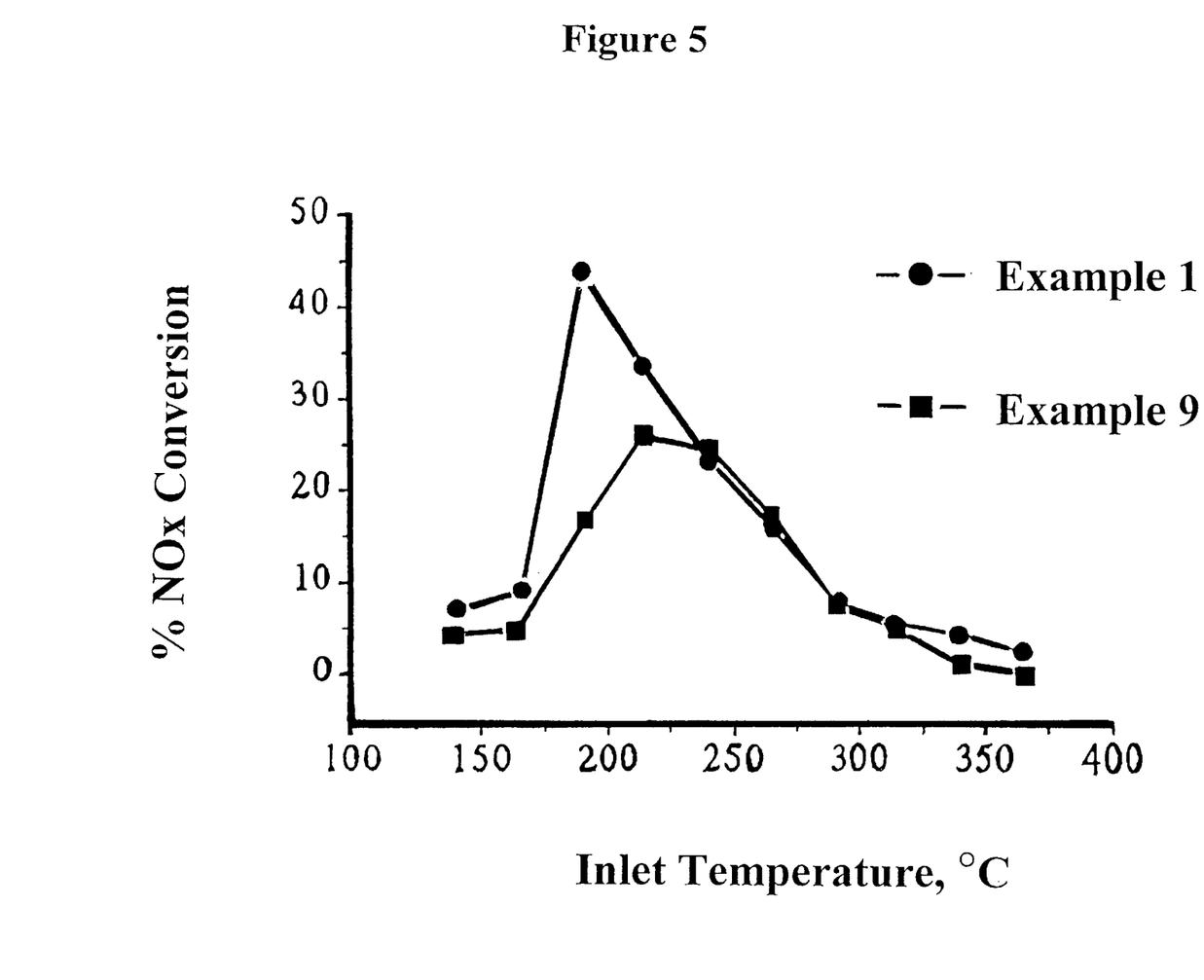
FIG. 5 presents data comparing the performance (shown as $NO_x$ conversion) of the present invention against that of a typical catalytic converter using a catalyst similar to that taught in Lachman '991 when used to treat exhaust gas from the same lean-burn diesel engine.

The results of this test are shown in FIG. 5. $NO_x$ conversion versus converter inlet temperature is plotted for each of the converters, with the performance of the converter using the catalyst prepared as in Example 3 (using the suspension of Example 1) shown as solid circles, ●, and that of the converter using the system prepared as in this Example 9 as solid squares, ■. It is clear that the converter of the present invention demonstrates far superior $NO_x$ conversion compared to the converter using a catalyst formulation similar to that taught by Lachman.

We claim:

1. A process for making a catalyst containing at least one type of molecular sieve crystals having noble metal dispersed on the exterior surface of said molecular sieve crystals such that at least 90% of the noble metal is located within 500 Å of the exterior surface of said molecular sieve crystals comprising:
    a) preparing an aqueous suspension of at least one type of molecular sieve crystals and a noble metal reagent, said reagent being of the type that, when suspended in water, will chemisorb onto the exterior 500 Å of said crystals;
    b) adjusting the pH of the suspension to above about 7 with a material that will decompose to yield gaseous products when its temperature is raised to above about 150° C.;
    c) stirring the suspension until the molecular sieve crystals and reagent are thoroughly mixed and the chemisorption has taken place;
    d) coating a suitable substrate with the product of step (c) thereby preparing a coated substrate having a coating thickness between 1–20 microns;
    e) drying the coated substrate, and, thereafter,
    f) calcining said coated substrate at a temperature between about 400° C. to about 550° C. for at least two hours.

2. The process of claim 1 wherein a second type of molecular sieve crystal is added to the suspension after step (c) and before step (d).

3. The process of claim 2 wherein, prior to the coating step, a binder is added to the suspension, said binder being selected from the group consisting of alumina, silica, alumina-silicates, titania, magnesia, zirconia, beryllia, and mixtures thereof.

4. The process of claim 3 wherein the binder is milled alumina.

5. The process of claim 1 wherein the pH is adjusted with tetramethylammonium hydroxide.

6. The process of claim 1 wherein the noble metal is in the form of colloidal particles and is selected from the group consisting of Pt, Pt alloyed with Rh, Ir, Pd, Ag, or Au, and mixtures thereof.

7. The process of claim 1 wherein the substrate is a monolith.

8. A process for making a catalyst containing at least one type of molecular sieve crystals having noble metal uniformly dispersed on the exterior surface of said molecular sieve crystals such that at least 90% of the noble metal is located within 500 Å of the exterior surface of the crystals comprising:
    a) preparing an aqueous suspension of at least one type of molecular sieve crystals and an amount of a hydrophilic polymer having a density of between about 0.8 and about 1.0 gm/cm$^3$, said amount of hydrophilic polymer being sufficient to fill the pores of said molecular sieve crystals;
    b) adding a noble metal reagent to the product of step (a);
    c) adjusting the pH of the suspension to above about 7 with a material that will decompose to yield gaseous products when its temperature is raised above about 150° C.;
    d) stirring for at least one hour;
    e) adding an aqueous suspension of binder to the product of step (d);
    f) stirring the product of step (e) for at least one hour;
    g) coating a substrate with the product of step (f) thereby preparing a coated substrate; and
    h) drying and calcining said coated substrate.

9. The process of claim 8 wherein a second type of molecular sieve crystal is added to the suspension after step (c) and before step (d).

10. The process of claim 9 wherein the binder of step (e) is selected from the group consisting of alumina, silica, alumina-silicates, titania, magnesia, zirconia, beryllia, and mixtures thereof.

11. The process of claim 10, wherein the binder is milled alumina.

12. The process of claim 8 wherein the hydrophilic polymer is selected from the group consisting of polyethylene glycol, polyvinyl glycol and polyvinyl pyrollidone.

13. The process of claim 8 wherein the noble metal is in the form of colloidal particles and is selected from the group consisting of Pt, Pt alloyed with Rh, Ir, Pd, Ag, or Au, and mixtures thereof.

14. The process of claim 8 wherein the substrate is a monolith.

15. A process for making a catalyst containing at least one type of molecular sieve crystals having noble metal predominantly on the exterior surface of at least one type of said molecular sieve crystals comprising:

a) preparing an aqueous suspension of at least one type of molecular sieve crystals and colloidal particles of noble metal, the size of said noble metal particles being at least twice the largest crystallographically-defined pore diameter of the molecular sieve crystals;

b) adjusting the suspension pH to between about 7 and about 8.;

c) stirring for at least one hour;

d) adding an aqueous suspension of binder to the product of step (d);

e) stirring the product of step (e) for at least one hour;

f) coating a substrate with the product of step (f) thereby preparing a coated substrate; and g) drying and calcining said coated substrate.

16. The process of claim 15 wherein a second type of molecular sieve crystal is added to the suspension after step (c) and before step (d).

17. The process of claim 16 wherein the binder is milled alumina.

18. The process of claim 15 wherein the binder of step (d) is selected from the group consisting of alumina, silica, alumina-silicates, titania, magnesia, zirconia, beryllia, and mixtures thereof.

19. The process of claim 15 wherein the pH of the suspension is adjusted, in step (b), with tetramethylammonium hydroxide.

20. The process of claim 15 wherein the noble metal is in the form of colloidal particles and is selected from the group consisting of Pt, Pt alloyed with Rh, Ir, Pd, Ag, or Au, and mixtures thereof.

21. The process of claim 15 wherein the substrate is a monolith.

* * * * *